US 6,659,519 B2

(12) United States Patent
Turner

(10) Patent No.: US 6,659,519 B2
(45) Date of Patent: Dec. 9, 2003

(54) SUPPLEMENTAL REAR BUMPER AND METHOD

(76) Inventor: Don S. Turner, 4315 Silvercrest Ct., North Las Vegas, NV (US) 89032

( * ) Notice: Subject to any disclaimer, the term of this patent is extended or adjusted under 35 U.S.C. 154(b) by 0 days.

(21) Appl. No.: 10/112,550

(22) Filed: Apr. 1, 2002

(65) Prior Publication Data

US 2003/0184100 A1 Oct. 2, 2003

(51) Int. Cl.[7] .............................................. B60R 19/24
(52) U.S. Cl. ........................ 293/117; 293/142; 293/155
(58) Field of Search ................................. 293/117, 155, 293/102 (U.S. only), 125, 142; 280/504; D12/169, 172

(56) References Cited

U.S. PATENT DOCUMENTS

| 4,225,167 | A | * | 9/1980 | Buettner et al. ........ 293/155 X |
| D269,423 | S | * | 6/1983 | Waite .......................... D12/169 |
| 4,950,010 | A | * | 8/1990 | Denny .......................... 293/117 |
| 5,478,124 | A | * | 12/1995 | Warrington et al. ......... 293/125 |
| D375,066 | S | * | 10/1996 | Tisi ............................. D12/167 |
| 5,647,621 | A | * | 7/1997 | McClellan .................. 293/117 |
| 5,829,774 | A | * | 11/1998 | Klemp ........................ 293/117 |
| 6,502,845 | B1 | * | 1/2003 | Van Vleet ............... 280/504 X |

* cited by examiner

Primary Examiner—Dennis H. Pedder
(74) Attorney, Agent, or Firm—Harry M. Weiss; Weiss, Moy & Harris, P.C.

(57) ABSTRACT

A supplemental bumper consists of an insertion section that is dimensioned to be inserted into a receiver hitch at the rear of a vehicle. The supplemental bumper further has a contact surface, which is preferably flat, and which is positioned below the fixed rear bumper. The positioning of the supplemental bumper is intended to eliminate or at least reduce the risk that a front portion of an oncoming vehicle will, upon rear-ending the vehicle with the supplemental bumper thereon, pass below the fixed rear bumper and cause potentially significant damage to each car.

1 Claim, 1 Drawing Sheet

SUPPLEMENTAL REAR BUMPER AND METHOD

BACKGROUND OF THE INVENTION

1. Field of Invention

This invention relates generally to methods and apparatuses for protecting vehicles in the event of a rear-end collision and, more specifically, to a supplemental rear vehicle bumper, inserted into a receiver hitch, and which provides supplemental impact protection to that provide by a fixed rear bumper in the event the subject vehicle is struck from behind by another vehicle, and method therefor.

2. Background of the Invention

The rear bumper on a vehicle is provided, of course, to protect in the event of an accident involving the rear portion of the vehicle. One type of accident that may occur is of the rear end variety, where the subject vehicle is struck from behind by an oncoming car.

It is often the case, particularly where the subject vehicle is relatively high profile, such as sports utility vehicles, that the front bumper of the oncoming car is at a lower height than the fixed rear bumper of the subject vehicle. In such instances, the oncoming car's front bumper will pass fully or at least partially below the subject vehicle's rear bumper, potentially resulting in significant damage to both cars and increased injury to the occupants of either or both. Generally, in such instance, the harm will be more significant than t would have been had the bumpers been of equal height.

Receiver hitches are a common vehicle accessory. They are typically positioned at the rear of the vehicle, usually below the rear bumper, and allow a vehicle to tow a wide variety of objects, including trailers and the like. When not in use, the hitch serves little or no purpose. For most hitch owners, the hitch is not in use far more often than it is used.

Therefore, a need existed for a method and apparatus for supplementally protecting a vehicle that is contacted from behind by an oncoming vehicle, where the bumper of the oncoming vehicle is lower than the bumper of the subject vehicle. The method and apparatus must take advantage of the receiver hitch, when otherwise not in use. The present invention satisfies these needs and provides other, related, advantages.

SUMMARY OF THE INVENTION

It is an object of the present invention to provide a method and apparatus for supplementally protecting a vehicle that is contacted from behind by an oncoming vehicle, where the bumper of the oncoming vehicle is lower than the bumper of the subject vehicle.

It is a further object of the present invention to provide supplemental protection for the rear portion of a vehicle that utilizes the receiver hitch, when otherwise not in use.

BRIEF DESCRIPTION OF THE PREFERRED EMBODIMENTS

In accordance with one embodiment of the present invention, a supplemental bumper for a vehicle is disclosed. The supplemental bumper comprises, in combination: an insertion section; a contact surface coupled at a substantially ninety degree angle to the insertion section; and means for providing horizontal stability and or limiting rotational movement of the contact surface relative to the insertion section about a point where the insertion section and the contact surface are coupled.

In accordance with another embodiment of the present invention, a method for protecting a vehicle that is struck from the rear by an oncoming vehicle is disclosed. The method comprises the steps of: providing a first vehicle; providing a hitch on a rear portion of the first vehicle and below a fixed rear bumper located on the first vehicle; providing a supplemental bumper comprising: an insertion section; a contact surface coupled at a substantially ninety degree angle to the insertion section; and means for providing horizontal stability and for limiting rotational movement of the contact surface relative to the insertion section about a point where the insertion section and the contact surface are coupled; and inserting the insertion section of the supplemental bumper into the hitch so that the contact surface will be positioned below the fixed rear bumper and at a height calculated to contact a front portion of a second vehicle that contacts the first vehicle at a rear portion thereof.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
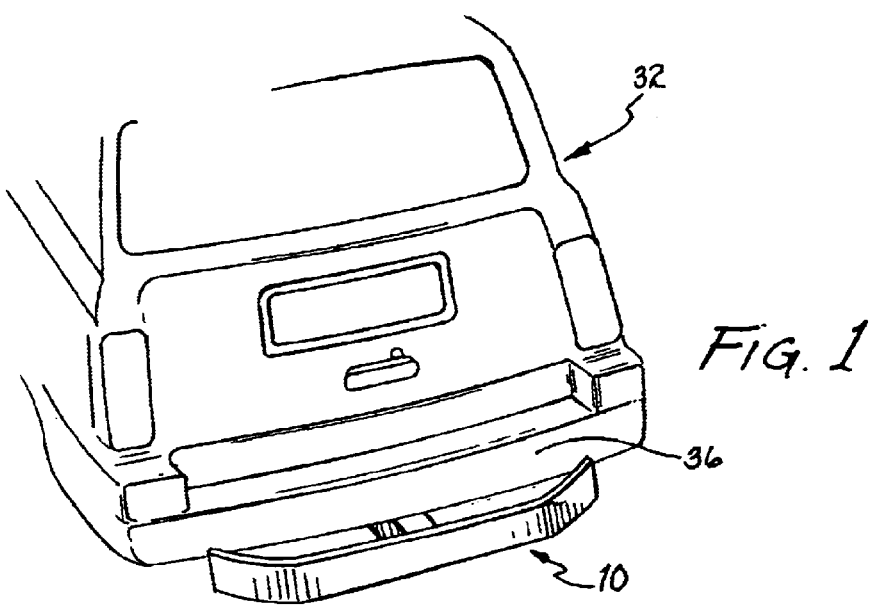
FIG. 1 is a perspective view of an embodiment of the apparatus of the present invention, in position on the rear of a subject vehicle.

Referring to the embodiment of FIGS. 1–4, an embodiment of a supplemental bumper 10 is shown. The supplemental bumper 10 preferably comprises an insertion section 12, dimensioned to be inserted into a receiver hitch opening 14 of a hitch 16 in the manner shown in FIG. 2. (Because receiver hitch openings 14 come in more than one size, it may be necessary to either provide an adapter for purposes of accommodating more than one size of hitch openings 14, or to provide supplemental bumpers 10 having insertion sections 12 of different sizes, so as to be able to accommodate the desired hitch opening 14.)

Figure 2:
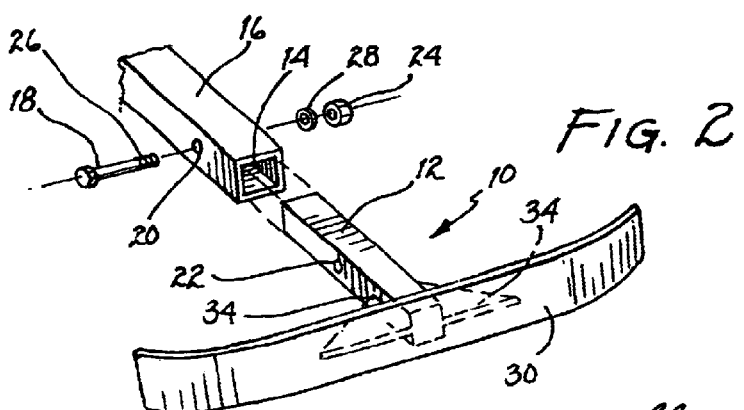
FIG. 2 is an exploded, perspective view of an embodiment of the apparatus of the present invention, illustrating coupling of the apparatus to a receiver hitch opening.
Figure 3:
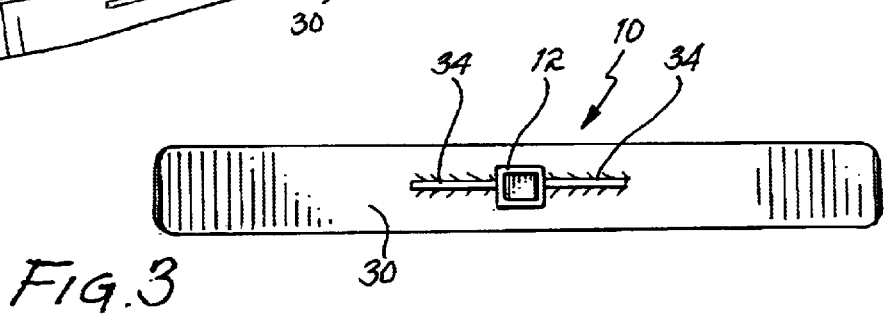
FIG. 3 is a rear view of the apparatus of FIG. 2.
Figure 4:
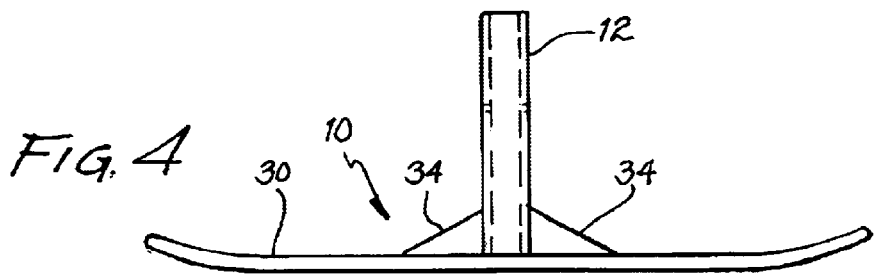
FIG. 4 is a top view of the apparatus of FIG. 2.

As shown in FIG. 2, one method for securely retaining the insertion section 12 to the hitch 16 is to insert a bolt 18 through aligned openings through each of the hitch 16 and insertion section 12, respectively. The bolt 18 may be securely maintained in position by attaching a nut 24 to a threaded portion 26 of the bolt 18. (It will be preferred, in this embodiment, to position a washer 28 between the nut 24 and the hitch 16.) Of course, other methods for attaching the insertion section 12 to the hitch 16 would be possible, including for example by using a bolt/cotter pin assembly or the like.

At the opposite end of the supplemental bumper 10, a contact surface 30 is attached at a substantially ninety degree angle to the insertion section 12. The face of the contact surface 30 is preferably flat. It is further preferred that the contact surface 30 be angled about both ends thereof in the direction of the front of the vehicle 32, so as to provide a deflecting effect if the rear of the vehicle 32 is struck off-center.

To strengthen the supplemental bumper 10, and to resist rotational movement of the contact surface 30 in a horizontal plane relative to the insertion section 12 in the event of impact, it is preferred to provide gussets 34 at either side of the point at which the insertion section 12 and the contact surface 30 are connected. It would be possible, without departing from the spirit or scope of the present invention, to substitute other strengthening means for the gussets 34 to provide the desired horizontal stability. For example, it would be possible to provide a plate (not shown) at the point where the insertion section 12 and contact surface 30 are coupled. It would further be possible to provide bars or the like to couple between these two members. Other structures could also be utilized.

It will generally be preferred to weld the component portions of the supplemental bumper 10 herein described to one another, including the insertion section 12 to the contact surface 30 and the gussets 34 to each of the insertion section 12 and the contact surface 30.

As shown in FIG. 1, it will generally be preferred to position the supplemental bumper 10 below the permanent vehicle bumper 36, so that the contact surface 30 projects slightly beyond the bumper 36. While the contact surface 30 may be positioned parallel to a surface of the bumper 36 or even more proximate the front of the vehicle 32 than the surface of the bumper 36, it is believed that such configurations—while still conferring benefits as herein described—are less preferred.

While the invention has been particularly shown and described with reference to preferred embodiments thereof, it will be understood by those skilled in the art that the foregoing and other changes in form and details may be made therein without departing from the spirit and scope of the invention.

I claim:

1. A supplemental bumper for a vehicle having a receiver hitch located at a rear portion of the vehicle comprising, in combination:

an insertion section having an interior end portion for attachment to the receiver hitch at the rear portion of the vehicle below a rear bumper of the vehicle which has a length that extends horizontally across the rear portion of the vehicle;

a supplemental bumper connected to an exterior end portion of said insertion section, said supplemental bumper comprising a substantially flat member having an interior portion connected to the exterior end portion of said insertion section and an exterior portion for providing protection to the rear portion of the vehicle from any damage caused by being struck in the rear from another vehicle having a front bumper that is lower that the rear bumper of the vehicle, said supplemental bumper being spaced from the rear bumper of the vehicle by only said insertion section, extends in a horizontal direction parallel to a horizontal direction of the rear bumper and having a length extending a substantial portion of a length of the rear bumper; and means for providing horizontal stability and for limiting rotational movement of said supplemental bumper coupled to the interior portion of said substantially flat member, said means for providing horizontal stability and for limiting rotational movement of said supplemental bumper comprises a pair of gussets with each one of said pair of gussets being connected to both a portion of the exterior end portion of said insertion section and a portion of the interior portion of the substantially flat member, said substantially flat member of said supplemental bumper having angled end portions angled toward the vehicle.

* * * * *